United States Patent [19]
Kurdzo et al.

[11] Patent Number: 6,041,064
[45] Date of Patent: Mar. 21, 2000

[54] VOICE SERVER MODULE FOR ATM SWITCH

[75] Inventors: James Patrick Kurdzo, Watertown; Robert Alan Zakrzewski, Meriden, both of Conn.

[73] Assignee: General DataComm, Inc., Middlebury, Conn.

[21] Appl. No.: 09/015,303

[22] Filed: Jan. 29, 1998

[51] Int. Cl.[7] .................................................. H04L 12/66
[52] U.S. Cl. ......................... 370/466; 370/395; 370/401; 370/469; 370/474
[58] Field of Search .................................. 370/395, 401, 370/463, 465, 466, 467, 469, 474, 396, 397, 398, 399, 409, 522

[56] References Cited

U.S. PATENT DOCUMENTS

| | | | |
|---|---|---|---|
| 5,408,469 | 4/1995 | Opher et al. | 370/395 |
| 5,490,140 | 2/1996 | Abensour et al. | 370/395 |
| 5,673,263 | 9/1997 | Basso et al. | 370/396 |
| 5,715,245 | 2/1998 | Watanabe | 370/395 |
| 5,717,691 | 2/1998 | Dighe et al. | 370/401 |
| 5,764,645 | 6/1998 | Bernet et al. | 370/466 |
| 5,768,273 | 6/1998 | Aznar et al. | 370/395 |
| 5,809,022 | 9/1998 | Byers et al. | 370/395 |
| 5,822,321 | 10/1998 | Petersen et al. | 370/474 |
| 5,852,606 | 12/1998 | Prince et al. | 370/393 |
| 5,894,477 | 4/1999 | Brueckheimer et al. | 370/353 |
| 5,943,339 | 8/1999 | Mauger | 370/397 |
| 5,949,791 | 8/1999 | Byers et al. | 370/466 |

OTHER PUBLICATIONS

ITU–T I.363.5, B–ISDN ATM Adaptation Layer Specification: Type 5 AAL, Aug. 1996, 59 pages.

ITU–T I.363.1, B–ISDN ATM Adaptation Layer Specification: Type 1 AAL Aug. 1996, 46 pages.

ITU–T I.363.2, B–ISDN ATM Adaptation Layer Specification: Type 2 AAL. Sep. 1997, 74 pages.

ITU–T I.366.1, Segmentation and Reassembly Service Specific Convergence Sublayer for the AAL type 2, Jun. 1998, 32 pages.

ITU–T, I.366.2 AAL Type 2 Service Specific Convergence Sublayer for Trunking, Oct. 1998, 111 pages.

Draft new ITU–T Recommendation Q.aal2 AAL type 2 Signalling Protocol (Capability Set 1), 1999, 70 pages.

*Primary Examiner*—Ricky Ngo
*Attorney, Agent, or Firm*—David P. Gordon; David S. Jacobson; Thomas A. Gallagher

[57] ABSTRACT

A voice server module for an ATM switch is provided and generally includes an interface block which receives and multiplexes high speed preprocessed data, a voice processing block which compresses voice data and which is coupled to the interface, an ATM adaptation layer (AAL) processor which receives uncompressed data and compressed data and which formats the uncompressed data into ATM AAL1 format and the compressed data into ATM AAL2 format, and a management processor which configures the interface block, the voice processing block, and the AAL processor. The interface means receives data which originated from up to four E1 or T1 lines, and multiplexes the data into a high speed serial data stream. The data stream is then sent both to the voice processing block and to the AAL processor, with the voice processing block ignoring all but the voice data portion of the data stream, and the AAL processor ignoring the voice data portion of the data stream. In this manner, AAL1 data is passed directly to the AAL processor without burdening the voice processing block, while data destined to become AAL2 type data is passed to the voice processing block for compression and then forwarded in a compressed form to the AAL processor.

14 Claims, 7 Drawing Sheets

VOICE SERVER MODULE FOR ATM SWITCH

1. FIELD OF THE INVENTION

The present invention relates broadly to the field of telecommunications. More particularly, the present invention relates to a voice server module for an asynchronous transfer mode (ATM) switch or node which implements AAL1, AAL2 and AAL5 adaptation as well as voice data processing. The AAL1, AAL2, and AAL5 specifications (ITU-T Recommendations I363.1, I363.2 and I363.5) are hereby incorporated by reference herein in their entireties.

2. STATE OF THE ART

Perhaps the most awaited, and now fastest growing technology in the field of telecommunications in the 1990's is known as Asynchronous Transfer Mode (ATM) technology. ATM is providing a mechanism for removing performance limitations of local area networks (LANs) and wide area networks (WANs) and providing data transfers at a speed of on the order of gigabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

In practice, ATM technology is presently being used primarily to pass data according to ATM adaptation layer (AAL) standards specification AAL1 (for serial data) and specification AAL5 (for packetized data such as LAN traffic) which have been completed for some time. The carrying of voice, on the other hand, has been limited because the ITU standards specification for AAL2 (for voice) has only recently been adopted.

While implementation of equipment for carrying out the standards with respect to AAL2 is relatively straightforward, when the equipment is required to implement more than just AAL2 (e.g., AAL1 and/or AAL5 in conjunction with AAL2), the complexity is increased considerably. In addition, where voice processing (i.e., data compression) such as ADPCM (adaptive differential pulse code modulation) or silence removal is desired in conjunction with the implementation of AAL2, the complexity of the equipment is increased even more. While brute force methods can be utilized to accomplish the desired complex tasks, such solutions are often too costly to be feasible. Thus, elegant techniques for implementing voice processing in ATM nodes implementing AAL2 ATM standards are needed, as well as elegant techniques for implementing ATM nodes which efficiently implement the AAL2 standard for voice and one or more of the AAL1 and AAL5 standards for data.

SUMMARY OF THE INVENTION

It is therefore an object of the invention to provide a voice server module for an ATM switch.

It is another object of the invention to provide an ATM switch voice server module which is capable of compressing voice data.

It is additional object of the invention to provide a voice server module for an ATM switch which implements both AAL1 and AAL2.

It is a further object of the invention to provide a flexible voice server module for processing data and voice information provided to an ATM switch on several E1 or T1 lines which carry numerous channels.

In accord with the objects of the invention, a voice server module for an ATM switch is provided and generally includes interface means for receiving and multiplexing high speed preprocessed data, voice processing means for compressing voice data which is coupled to the interface, adaptation layer processor means for receiving uncompressed data and compressed data and for formatting the uncompressed data into ATM AAL1 format and the compressed data into ATM AAL2 format for sending to the ATM switch fabric, and management processor means for configuring the interface means, the voice processing means, and the adaptation layer processor means. Preferably, the interface means, the voice processing means, and the adaptation layer processor means of the voice server module have reverse functionality: i.e., the adaptation layer processor means can take AAL2 and AAL1 formatted data and generate compressed and uncompressed data streams therefrom; the voice processing means can take the compressed data stream and generate an uncompressed voice data stream therefrom; and the interface means can receive uncompressed data from both the adaptation layer processor means and the voice processing means and demultiplex the data for output.

According to a first preferred aspect of the invention, the interface means receives data which originated from up to four E1 or T1 lines, and multiplexes the data into a high speed serial data stream. The data stream is then sent both to the voice processing means and to the adaptation layer processor means, with the voice processing means ignoring all but the voice data portion of the data stream, and the adaptation layer processor means ignoring the voice data portion of the data stream. In this manner, AAL1 data is passed directly to the adaptation layer processor means without burdening the voice processing means, while data destined to become AAL2 type data is passed to the voice processing means for compression and then forwarded in a compressed form to the adaptation layer processor means.

According to a second preferred aspect of the invention, the voice processing means comprises a series of arrays of digital signal processors (DSPs) in conjunction with an array of field programmable gate arrays (FPGAs); with each FPGA being assigned to an array of DSPs. Data transmission between (to and from) the FPGAs and DSPs is according to a frame. Thus, the FPGAs are utilized to direct data received from the interface means and from the adaptation layer processor means to appropriate DSPs for processing. The DSPs are preferably programmed to conduct various desired voice processing algorithms, including silence removal or insertion, two- three- or four-bit ADPCM encoding and decoding, echo cancellation, fax/modem tone detection, etc. Because of the nature of voice processing, each of the DSPs must be capable of significant processing power. At the same time, however, power consumption and costs must be considered. Thus, according to the invention, DSPs are selected which are capable of processing two channels of voice simultaneously.

According to a third preferred aspect of the invention, data which is processed and compressed by the voice processing means is sent on a high speed serial bus to the adaptation layer processing means in conjunction with flags which are sent on another high speed serial bus. In a first embodiment of this aspect of the invention, for each byte of data (sent serially on the high speed serial bus), at least one bit of flag data is sent on the flag bus. In one arrangement of this embodiment, the flag bit is used to indicate whether the data on the high speed data bus is valid or not (i.e., data or no data), tone detection, silence removal, and the type of encoding being utilized. In a second embodiment of this aspect of the invention, the flag bus is used both to synchronize the adaptation layer processing means and the voice processing means (preferably, according to a forty frame superframe of five milliseconds) as well as to send control information. The control information includes a bit which indicates whether the data is compressed or not, a bit to indicate silence, a bit to indicate tone detection, and a bit to indicate an "out of data" indication.

According to a fourth preferred aspect of the invention the management processor means utilizes a packet-type protocol in corresponding with the other elements of the voice server module. In addition, the management processor is configured to receive the "D"-channels of ISDN signals received by the voice server module interface, while the adaptation layer processing means is configured to format data according to the AAL5 format.

According to additional preferred aspects of the voice server module, a channel associated signalling (CAS) processor is provided to process channel associated signalling (e.g., on-hook, off-hook, ring, failure states, etc.) received by the voice server module, while the management processor is utilized to process D-channel signalling provided with incoming ISDN signals. Also, the management processor is provided access to all of the DSPs in the DSP arrays in order to configure the DSPs and obtain status information therefrom. The DSPs are preferably configured to provide one or more of echo cancelling, silence removal, data compression and tone detection.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
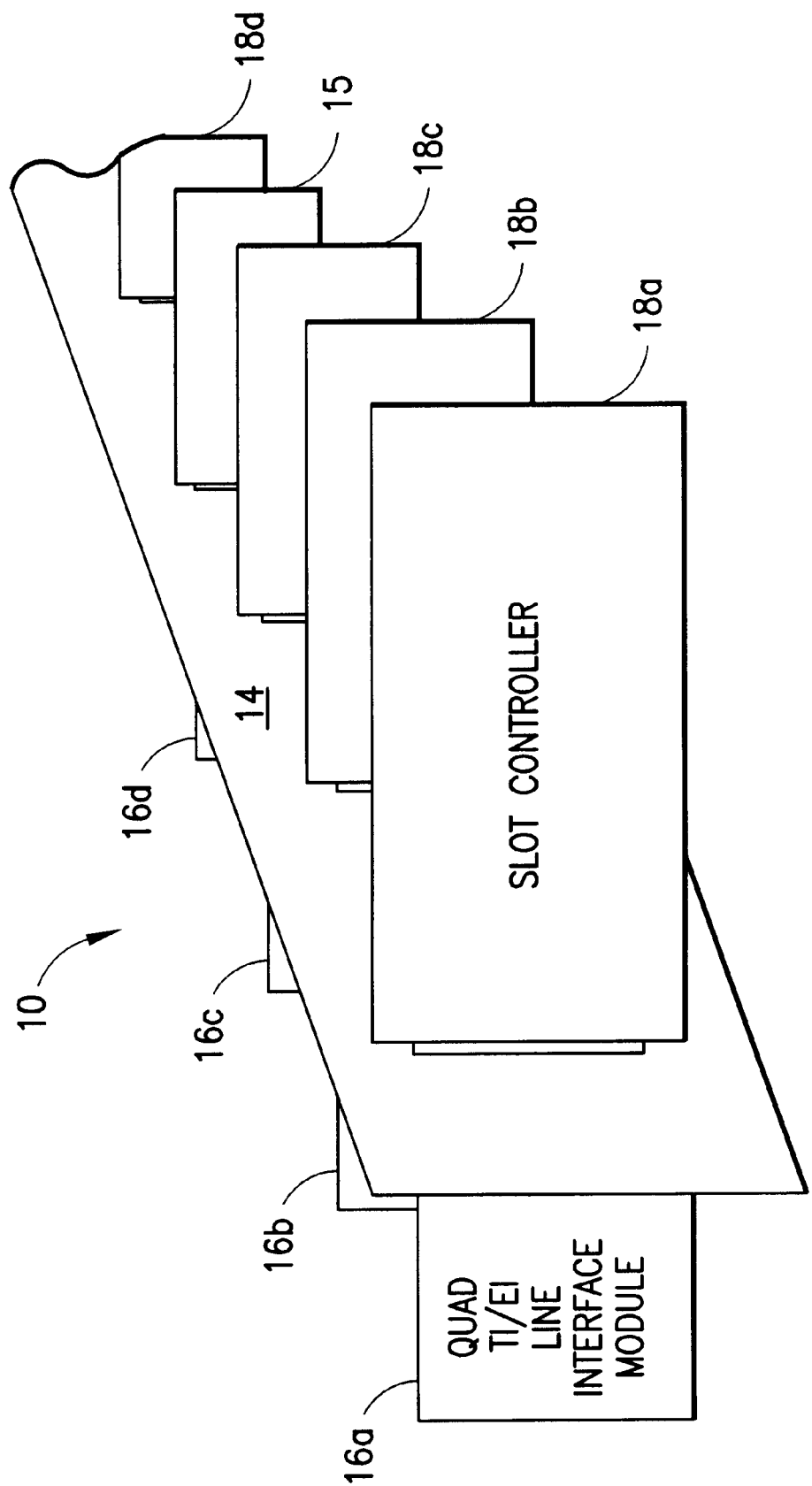
FIG. 1 is a schematic diagram of an ATM switch incorporating the voice server module of the invention.

An ATM switch 10 such as the GDC APEX (a registered trademark of General DataComm, Inc.) is seen in FIG. 1. The ATM switch 10 includes a mid-plane 14 having a switch fabric card 15, a plurality of line interface modules (LIMs) 16a, 16b . . ., and a plurality of controller cards (also called "slot controllers") 18a, 18b, . . . The function of each of the LIMs 16 is to take incoming electrical or optical signal information from various lines, such as data channels, private networks, public networks, etc., to extract data and timing information therefrom, and to send a TTL digital signal representative of the data to an associated controller card 18. The controller cards include adaptation controllers and cell controllers. The function of the adaptation controller is to convert the TTL digital signals received from LIMs receiving legacy signals (e.g., T1, E1) into an ATM signal (i.e., ATM adaptation). The ATM signal is then forwarded to the switch fabric for switching as desired. After switching, the ATM signal is provided to a cell controller which forwards the ATM signal to a LIM which is coupled to the ATM network (not shown).

According to the present invention at least one of the slot controllers 18 of the ATM switch 10 is a voice server module (VSM) which is configured to accept voice data, as well as other data from a LIM. In a preferred embodiment, each VSM slot controller 18VSM is capable of processing data received from a LIM which is coupled to four E1 or T1 lines at 2.048 Mbits/sec or 1.544 Mbits/sec respectively. Where the LIM is coupled to T1 lines, the LIM performs a timing conversion such that the data presented to the VSM slot controller 18VSM is at the E1 2.048 Mb/s rate.

Figure 2:
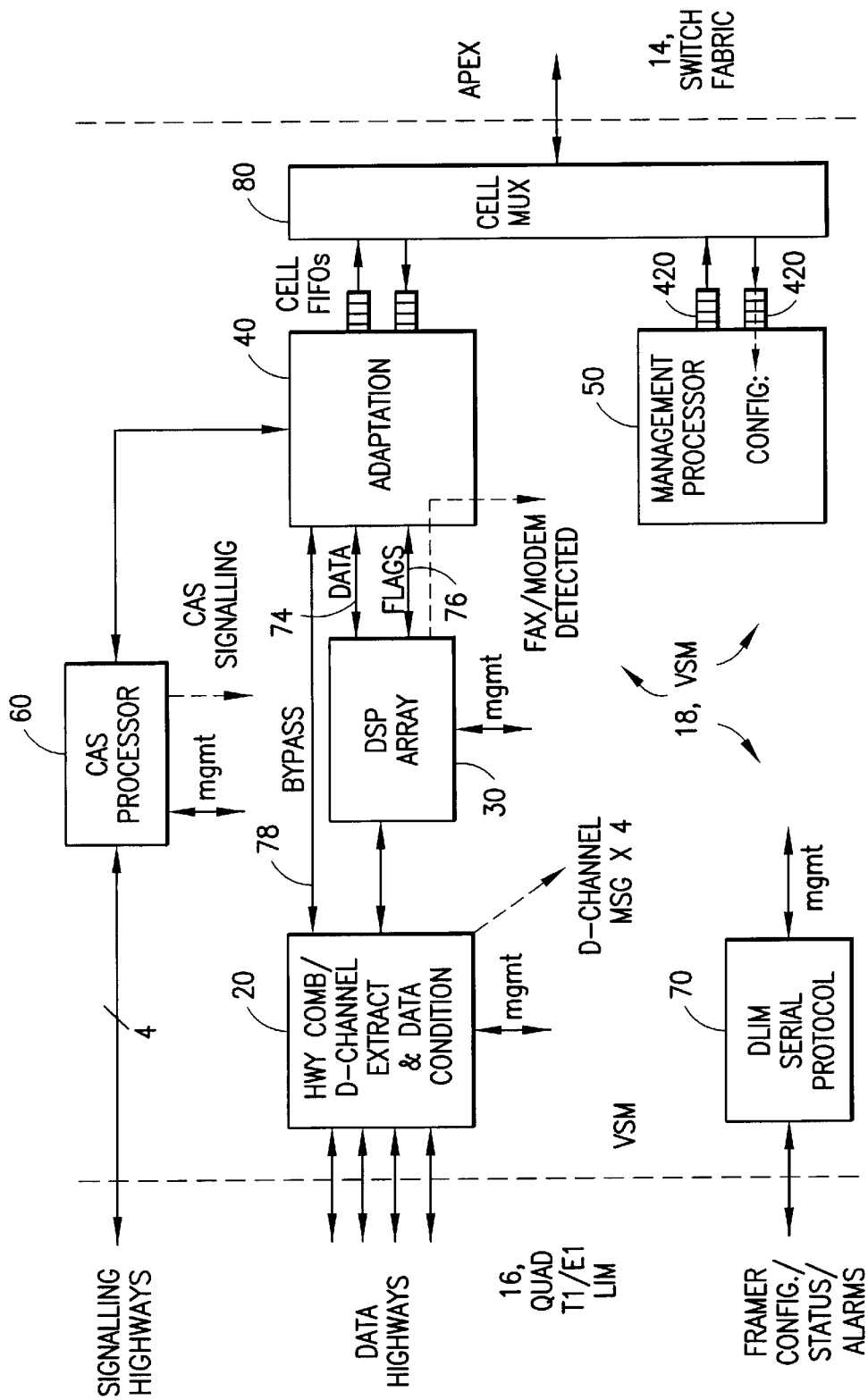
FIG. 2 is a block diagram of the voice server module of the invention.

Turning to FIG. 2, a block diagram of a voice server module 18VSM is seen. The voice server module 18VSM includes a multiplexer/interface 20, a voice processing DSP array 30 for processing voice data, an adaptation layer processor 40, a management processor 50, a channel associated signaling (CAS) processor 60, and a LIM-management interface 70. Broadly, in one direction, the interface 20 receives four 2.048 Mb/s PCM data from a LIM, combines the data into a single 8.192 Mb/s PCM highway for the voice processing DSP array 30 and for the adaptation layer processor 40, and extracts D-channel information for the management processor 50. The voice processing DSP array 30 receives the data from the interface 20, and, under instruction from the management processor 50, processes only the voice data portion of the data stream. The processing of the voice data can include one or more of echo cancellation, silence detection and removal, fax/modem tone detection, and data compression using any of various voice compression techniques (e.g., LD-CELP (G.728 standard), CS-ACELP (G.729 standard), ADPCM, etc.). The output of the voice processing DSP array 30 is provided to the adaptation layer processor 40 as a compressed data signal on an 8.192 Mb/s data bus 74 in conjunction with a 8.192 Mb/s flag bus 76 which is preferably synchronous with the data bus 74. The adaptation layer processor 40 (which is preferably implemented as a RISC processor and coprocessor available from Maker Communications Inc. under the chip numbers MXT 3010 and MXT 3020) receives the compressed data signal from the DSP array 30, as well as a copy of the combined data from the interface 20 (via bypass bus 78), and on a per-timeslot basis selects between the two. More particularly, where the data is AAL1 type data, the adaptation layer processor 40 accepts the data from the bypass bus 78; whereas where the data is AAL2 type (voice) data, the adaptation layer processor 40 accepts the data from the data bus 74 which is sent in conjunction with flag bus information. The adaptation layer processor 40 processes the data into ATM cells with appropriate AAL1 and AAL2 formatting in accordance with ITU-T Recommendations I363.1 and I363.2, and passes the cells to the switch fabric of the ATM switch. As will be described in detail with reference to FIG. 4a, where silence is detected and indicated by the flags, no cell is generated by the adaptation layer processor 40.

It will be appreciated that preferably, additional data (AAL5 in particular), independent of the adaptation layer processor 40, may be sent by the management processor 50 to the switch fabric via an ATM cell multiplexer 80 shown between the adaptation layer processor 40 and the ATM switch fabric. Also, if desired, data which is intended for AAL5 type adaptation may be sent from the management processor 50 to the adaptation layer processor 40 for processing according to ITU-T Recommendation I363.5 and forwarding to the switch fabric.

Briefly, in the other direction, cells received from the switch fabric of the ATM switch are passed via the (de) multiplexer 80 to the adaptation layer processor 40 and the management processor 50. The cells received by the adaptation layer processor 40 are typically disassembled by the adaptation layer processor 40, with AAL2 related information being sent via bus 74 (with associated signaling on flag bus 76) to the DSP array 30, and AAL1 related information being sent via bypass bus 78 to the multiplexer interface 20. The DSP array 30 decompresses and otherwise processes the AAL2 voice data as necessary, and provides an output to the interface 20. Thus, the interface 20 receives data from both the voice processing array 30 and from the adaptation layer processor 40, and, on a per-timeslot basis, selects between the two, and converts the result into four 2.048 Mb/s PCM highways for output to the LIM.

Before turning to details of each specific block of the voice server module 18VSM, additional functionality is seen with reference to the channel associated signalling (CAS) processor 60 and the DLSP interface 70. The CAS processor is provided to process (e.g., filter, refresh, convert, and condition) channel associated signalling (e.g., on-hook, off-hook, ring, failure states, etc.) received by the voice server module from the LIM. The processed CAS information is provided to the adaptation layer processor 40. The DLSP interface 70 is used to communicate between the management processor and the LIM.

Figure 3:
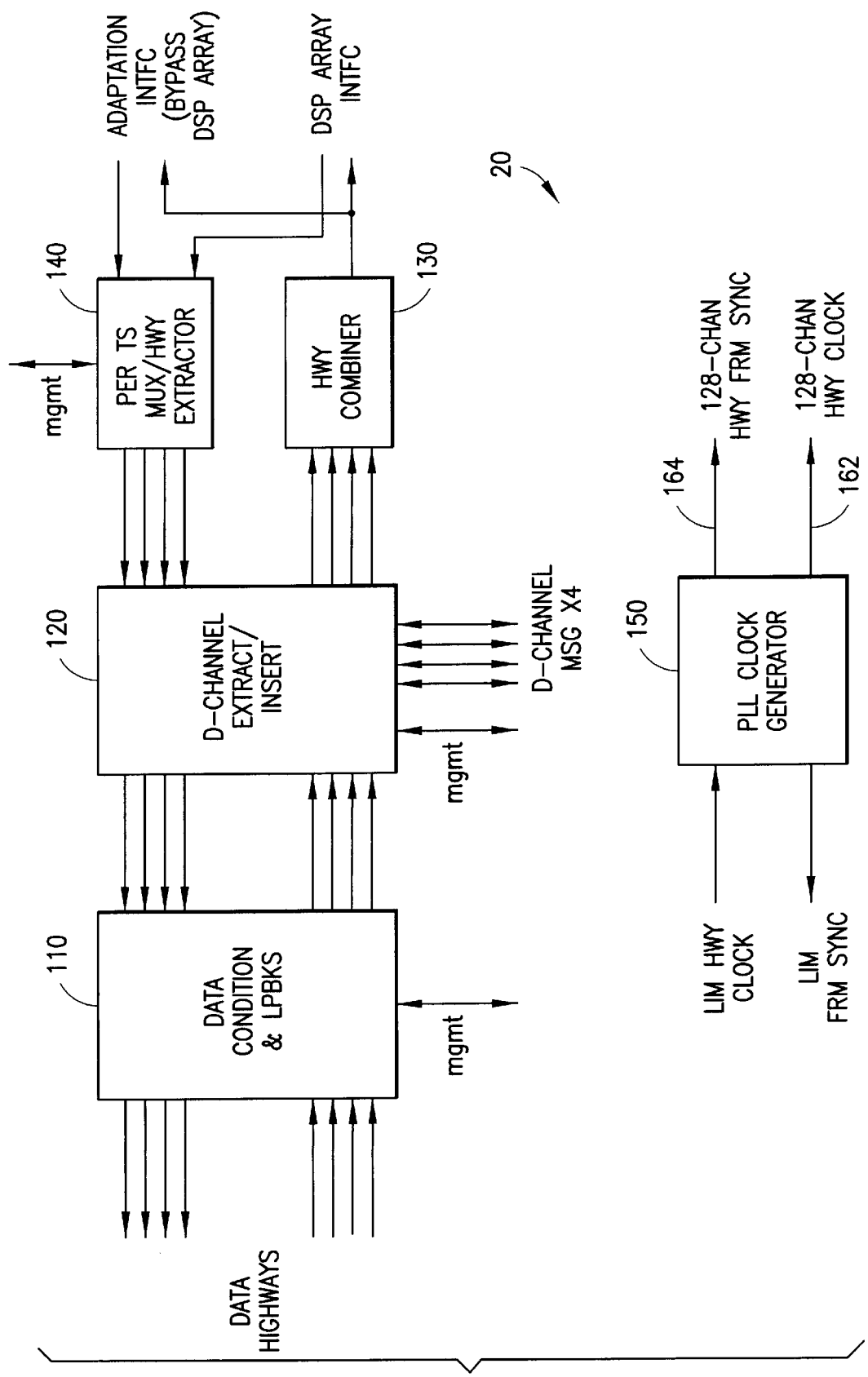
FIG. 3 is a block diagram of the functional blocks of the interface means of FIG. 2.

Turning now to FIG. 3, a functional block diagram of the interface 20 is seen. Functionally, the interface 20 includes a data conditioning and loopback block 110, a D-channel extractor/inserter 120, a multiplexer (highway combiner) 130, a per timeslot demultiplexer 140, and a phase-locked-loop clock generator 150. In particular, a 2.048 MHz PCM LIM clock is received by the PLL clock generator 150, and four lines of data which originated from four E1 or T1 lines are received by the data conditioning and loopback block 110 from a LIM. The LIM clock is used by the PLL clock generator 150 to generate a high speed (e.g., 8.192 MHz) 128-channel highway clock 162, and a frame sync signal (at an 8 Khz frame rate for identifying the first time slot in the PCM frame) 164. The four lines of data are conditioned by block 110 as is known in the art. In addition, block 110, under control of the management processor 50 (FIG. 2), can cause data to be directly looped back to the LIM. Data which is conditioned by the data conditioning and loopback block 110 is forwarded to the D-channel extractor/inserter 120, which extracts D-channels from ISDN signals (under control of the management processor) and forwards them to the management processor 50. The remaining signal is forwarded to a highway combiner 130 which multiplexes the four lines together into a single 8.192 Mbit/sec serial data stream. As indicated in FIGS. 2 and 3, the combined signal is forwarded both to the DSP array 30 and to the adaptation layer processor 40; although if desired, a controlled switch could be utilized to send the appropriate data to each on a per timeslot basis.

In the return direction (from the switch to the LIM), it will be appreciated that data is received at the per timeslot demultiplexer 140 from both from the DSP array 30 and the adaptation layer processor 40. The demultiplexer 140, under control of the management processor 50, chooses on a per timeslot basis which data is to be forwarded to the LIM, and then demultiplexes the data into four data streams. The four data streams are forwarded to the D-channel extractor/inserter, where D-channel data (if any) provided by the management processor 50 can be inserted into the data streams. The data stream is then sent to the interface conditioning block 110 which conditions the data as required for output as PCM data to the LIM.

Figure 4:
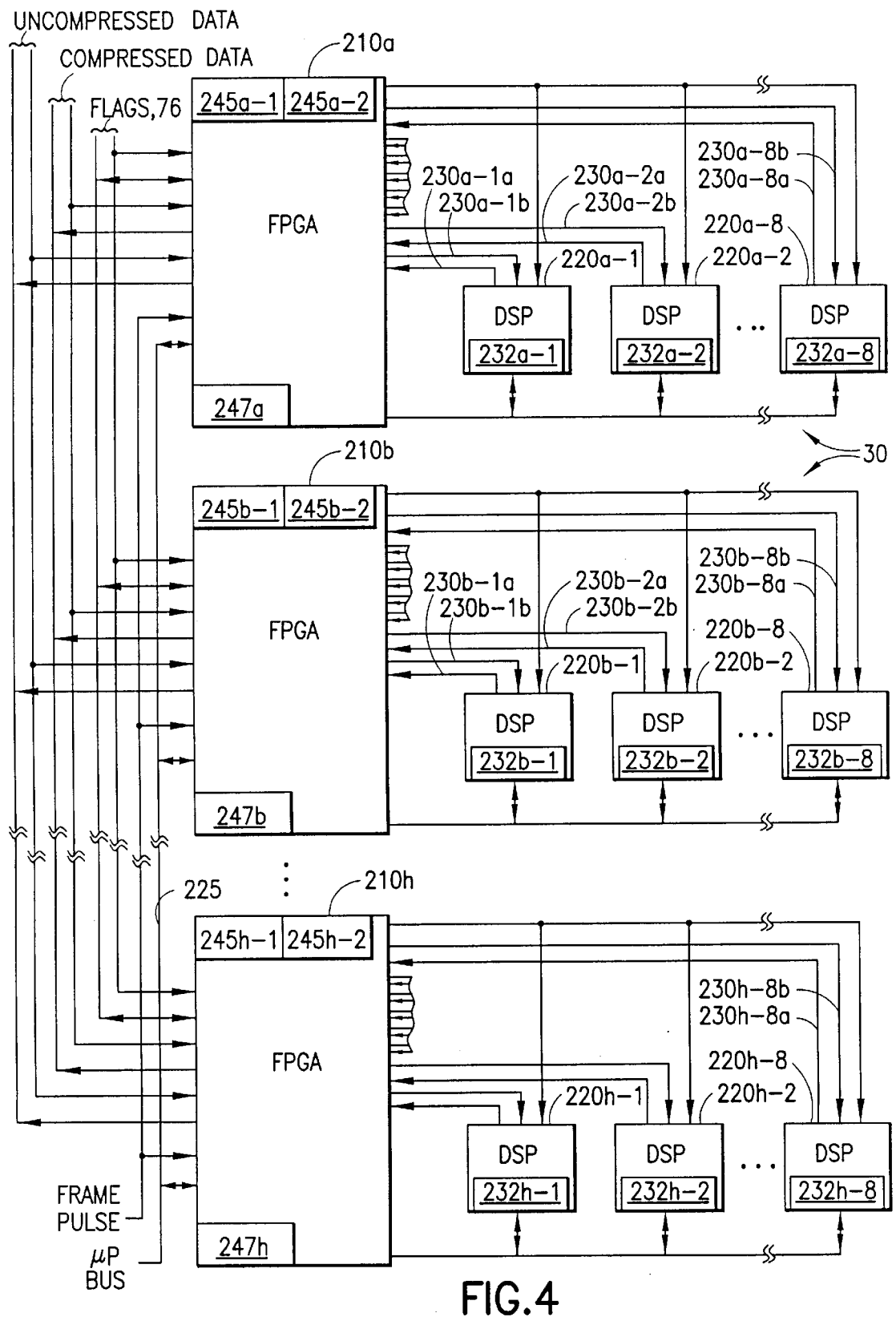
FIG. 4 is a block diagram of the voice processing means of FIG. 2.
Figure 4A:
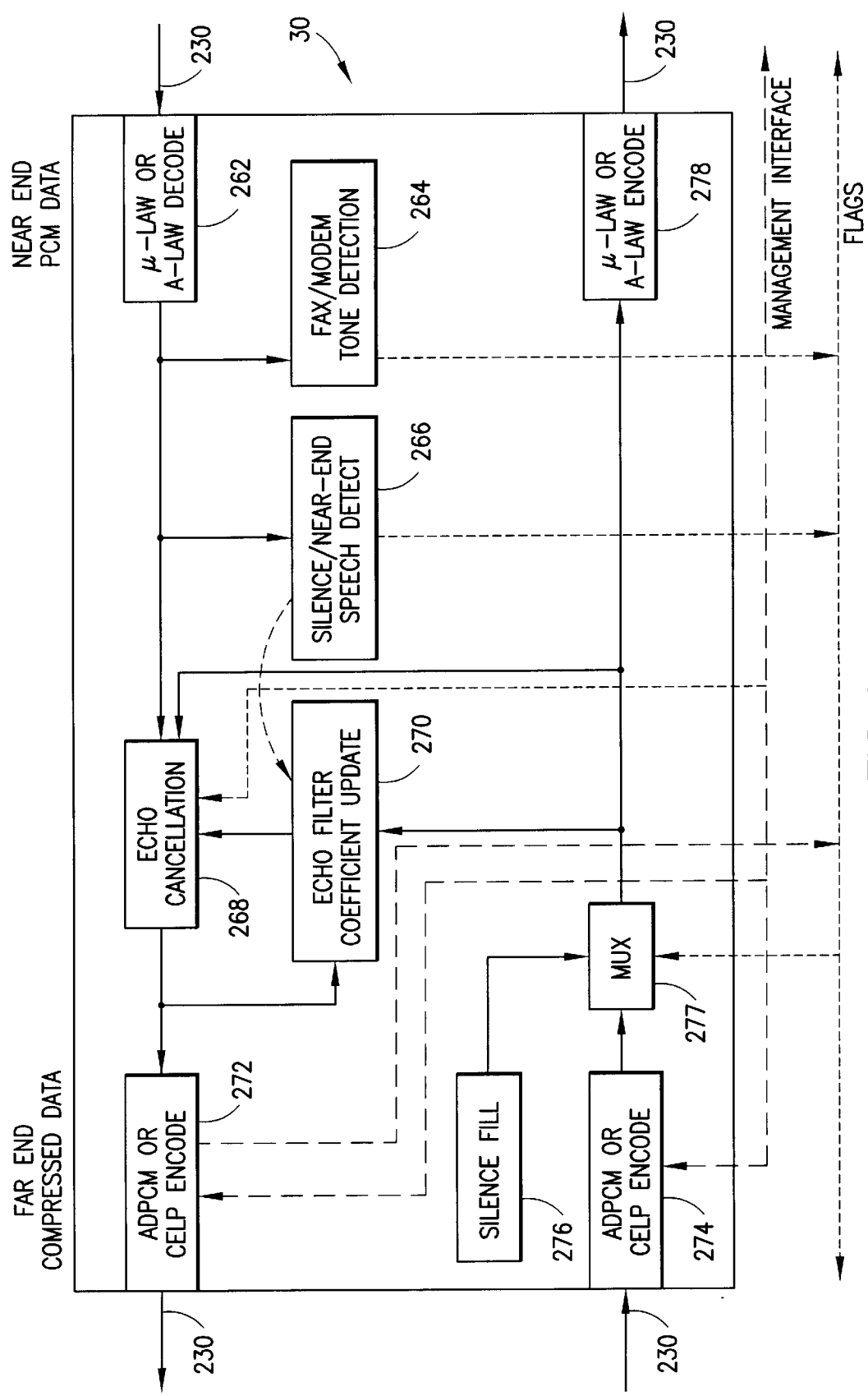
FIG. 4a is a block diagram of the functional blocks of each DSP of the voice processing means of FIG. 4.

Turning to FIGS. 4 and 4a, a block diagram and a functional diagram of the voice processing DSP array 30 of the invention are seen respectively. According to the preferred embodiment of the invention, the voice processing DSP array 30 includes eight field programmable gate arrays 210*a*, 210*b*, 210*c*, . . . 210*h*, and sixty-four DSPs 220*a*-1 through 220*a*-8, 220*b*-1 through 220*b*-8, 220*c*-1 through 220*c*-8, . . . , and 220*h*-1 through 220*h*-8. Each FPGA 210 is coupled to the high speed highway clock 162 and to the frame sync signal 164 provided by interface 110. In addition, each FPGA 210 is coupled to the management processor 50 via a management processor bus 225. Each FPGA 210*a*–210*h* is associated with an array of eight DSPs 220 which process the voice data provided by the specific FPGA.

The DSPs are preferably ADSP2185 processors available from Analog Devices, Inc. which consume very little power, and which are able to process at least two channels of voice data in real time as discussed below. Each ADSP2185 processor has its own 2.048 Mb/s serial input and output highways or buses 230 (e.g., 230*a*-1*a*, 230*a*-1*b*, 230*a*-2*a*, 230*a*-2*b*, . . . 230*a*-8*a*, 230*a*-8*b*, 230*b*-1*a*, 230*b*-1*b*, . . . 230*h*-8*a*, 230*h*-8*b*) for real time data, an internal DMA interface 232 (e.g., 232*a*-1, 232*a*-2, . . . 232*h*-8), and an internal 80K memory (not shown). Data is forwarded from the FPGAs to the DSPs according to a frame (discussed below), and a frame pulse is provided by the FPGAs to the DSPs as indicated in FIG. 4.

The 8.192 Mb/s data output of the interface 110 (one hundred twenty-eight time slots of 64 Kb/s data) is provided to each of the FPGAs 210 in the LIM-to-switch direction. Two additional 8.192 Mb/s signals (a data signal, and a flag signal) are provided to the FGPAs from the adaptation layer processor 40 in the switch-to-LIM direction. In both directions, each FPGA is programmed by the management processor to only obtain those channels of data which are to be processed by the eight DSPs 220 pertaining to that FPGA. The data received and accepted by each FPGA is written sequentially to a first FPGA buffer memory 245*a*-1 (through 245*h*-1) which is arranged to store an entire frame of data. While a frame of data is written into the first FPGA memory, another frame of data previously received by the FPGA is forwarded (read) from a second FPGA buffer memory 245*a*-2 (through 245*h*-2) to the DSPs for processing according to a frame. The frame is established in the configuration lookup RAM 247*a* (through 247*h*) of the FPGA by the management processor which effectively informs the FPGA as to which DSP in its array is to handle each particular channel. Which buffer memory data is read from and which buffer memory data is written to is switched every 125 microseconds (i.e., at a 8 Khz rate).

Since each bus 230 carrying data between the FPGA and each DSP is a 2.048 Mb/s bus, the timing of each bus may be divided into thirty-two 64 Kb/s timeslots; i.e., thirty-two bytes can be sent on each bus at an 8 Kbyte/s rate. Thus, according to a preferred aspect of the invention, the buses 230 are divided into eight sets of four timeslots, with each four-timeslot-set comprising an unused byte, an uncompressed byte, a compressed byte and a flag byte as seen in Table 1.

TABLE 1

| Bit | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | | 3 | | 5 | | 7 | | 9 | | 11 | | 13 | | 15 | | 17 | | 19 | | 21 | | 23 | | 25 | | 27 | | 29 | | 31 | |
| 0 | | 2 | | 4 | | 6 | | 8 | | 10 | | 12 | | 14 | | 16 | | 18 | | 20 | | 22 | | 24 | | 26 | | 28 | | 30 |
| N | U | C | F | N | U | C | F | N | U | C | F | N | U | C | F | N | U | C | F | N | U | C | F | N | U | C | F | N | U | C | F |

N = NOT USED  U = UNCOMPRESSED  C = COMPRESSED  F = FLAG

With this arrangement, up to eight bidirectional channels can be accommodated on a single bus; although according to the preferred embodiment of the invention, only two bidirectional channels are handled by any DSP at a time. In particular, the uncompressed byte of the four-timeslot-set is utilized in the LIM-to-switch direction for sending on a bus (e.g., 230a-1b) uncompressed data received by the FPGA from the interface 20; while the compressed byte and flag byte are used for the same channel in the switch-to-LIM direction for sending on the bus 230a-1b the compressed data and associated flag received by the FPGA from the adaptation layer processor 40. After the uncompressed data is processed by the DSP, the resulting compressed data byte and associated flags are sent in the compressed data byte and flag byte to the FPGA on bus 230a-1a for forwarding to the adaptation layer processor 40. Similarly, after the compressed data and flag byte are processed by the DSP, the resulting uncompressed data is sent on bus 230a-1a for forwarding to the multiplexer/interface 20.

The processing tasks of the DSPs 240 are shown in FIG. 4a. In the LIM-to-switch direction, A-law or μ-law data received from the multiplexer/interface 20 is decoded at 262 and sent for fax/modem tone detection at 264, for silence/near-end speech detection at 266, and for echo cancellation at 268 which utilizes an echo filter coefficient update block 270 in a feedback loop. Data which is being compressed is then encoded by an encoder 272, and the encoded data is sent along with flag information (as discussed below) to the FPGA. In the switch-to-LIM direction, compressed data is decoded at 274 and, in the case of silence, silence fill 276 is injected at multiplexer 277. The decoded, expanded data is used to update the echo filter coefficient update block 270, and is also provided to an encoder for A-law or μ-law encoding at 278.

More particularly, data received via the FPGA from the LIM is decoded by decoder 262 and subjected to modem tone detection at 264, because it is possible for any channel to change from voice data to fax/modem data during a session. The fax/modem detection is preferably implemented either utilizing a phase locked loop or according to the Goertzel Algorithm which computes the DFT of the primary harmonic of the 2100±21 Hz tone indicating a fax or modem transmission. A Hamming window is applied to the data to flatten the frequency response. If the tone is above a predefined level then a tone will be considered present. In a preferred embodiment, and as seen in FIG. 4a, a flag is output to indicate tone detection. In one embodiment, the flag is placed on bus 230 in the proper timeslot, and via the FPGA 210 (FIG. 4), the flag bus 76 (FIG. 2) and the adaptation processor 40 (FIG. 2), is provided to the management processor 50. In turn, the management processor 50 generates control signals which turns off echo cancellation and causes the ADPCM or CELP encode block 272 to pass data without encoding; i.e., the mode changes from a compression mode to a non-compression mode. Alternatively, a control signal could be generated directly by the fax/modem detector 264 for the echo cancellation block 268 to turn off echo cancellation and for the compression encoder 272 to turn off compression.

The decoded data is also subjected to silence detection by calculating at 266 the input signal levels. Where the input signal level is indicative of silence, a flag is generated which will notify the adaptation layer processor of the silence so that an ATM packet transmission can be suppressed.

The input signal level calculated at 266 is also used in the echo cancellation block 268. The echo cancellation algorithm utilizes an adaptive transversal filter implementation which reduces the mean-squared-error (MSE) of the echo and an estimate of the replica. The two functional blocks of the echo cancellation algorithm include the actual echo cancellation 268 and the adaptive filter coefficient update 270. Up to a twenty millisecond delay can be cancelled using a one hundred-sixty tap FIR filter with an 8000 Hz sampling rate. The maximum processable echo delay can be adjusted by changing the number of taps. The echo being removed consists of the far-end signal being returned as a dispersed signal with attenuation through the near end signal. The transfer function of the filter attempts to match this impulse response of the echo. This process is performed continuously for each channel. A residual error silence suppressor is also invoked when the ratio of the cancelled signal to the far-end input signal is less than −24 dB.

The coefficient update is performed during near-end silence and during far-end speech. It is assumed by recommendations G.165 and G.168 that the echo of the signal will be at least 6 dB down from the original signal. Therefore, if the near-end signal is not 6 dB (or other configurable value) down from the far-end signal, then a near-end signal is assumed to be present. When near-end speech is detected, the filter coefficients will not be updated. Since this calculation involves calculating signal level values, the values are also used in the silence detection algorithm. The residual error suppressor is automatically deactivated in the presence of a near-end signal.

After echo cancellation, the decoded signal is subjected to compression by the compression encoder 272. According to the preferred embodiment of the invention, the encoder 272 is capable of performing several different compression algorithms under control of the management processor. In the preferred embodiment, encoder 272 is capable of performing at a minimum 32 kbps ADPCM and LD-CELP. Other voice compression techniques include CSA-CELP. It will be appreciated that encoder 272 is preferably capable of ADPCM compression for the data of one channel, while performing a different compression for a different channel. Preferably, the signal of a particular channel will continually utilize a single compression technique after start-up; although, as previously indicated, the compression can be turned off when a fax/modem tone is detected by detector 264. In addition, flag information relating to the compression technique and/or data is generated by the DSP (by the ADPCM or CELP encoder 272, the silence detector 266, the fax/modem tone detector 264) and sent to the FPGA in the timeslot directly after the data (as indicated in Table 1).

In the switch-to-LIM direction, data and flag information from the adaptation layer processor 40 are received (via data bus 74 and flag bus 76, and FPGAs 210 and buses 230) by the decoder 274. The decoder 274 decodes (expands) the data (e.g., ADPCM-type or CELP-type data). If the flag information indicates silence, the multiplexer 277 is controlled to receive data from the silence fill 276 indicative of silence (e.g., a scaled background pseudorandom noise pattern). If the flag information is not indicative of silence, the multiplexer 277 passes the data decoded by the decoder 274. The decoded, expanded data is used to update the echo filter coefficient update block 270, and is also provided to an encoder for A-law or $\mu$-law encoding at 278. The A-law or $\mu$-law data is then sent to the FPGA for forwarding to the LIM as previously described.

As previously mentioned, in the LIM-to-switch direction, the DSP generates flag information which relates to the data being processed and which is sent to the FPGA directly after the processed data. This flag data is provided to buffer memory in the FPGA and then combined using timeslot mapping for forwarding onto the 8.192 Mb/s flag highway which couples the voice processing means 30 to the adaptation layer processor 40; while the processed data is forwarded into the 8.192 Mb/s data highway which couples processors 30 and 40. The compressed voice data and the flag data are preferably sent synchronously.

In a first embodiment of this aspect of the invention, for each byte of data (sent serially on the high speed serial bus), at least one bit of flag data is sent on the flag bus. In the preferred arrangement of this first embodiment, one or two bits are used to indicate whether the data on the data bus is valid or not; i.e., data or no data, one bit is used to indicate fax/modem tone detection, one bit is used for silence detection, and one or more bits are used to indicate which type of encoding is being utilized. Thus, for example, for each byte of data on the high speed data bus the additional bits may be utilized to distinguish between 2-bit ADPCM, 3-bit ADPCM, 4-bit ADPCM, 8-bit PCM, G.728 LD-CELP, G.729a CS-ACELP, etc. Technically, with n bits, $2^n$ different encoding schemes can be identified. Alternatively, if five or fewer encoding schemes are possible for the equipment, a single bit can be used as an ON-OFF bit for each encoding scheme (i.e., n bits for n encoding schemes) in order to indicate which encoding scheme is being utilized.

In a second, presently preferred embodiment of this aspect of the invention, the flag bus is used both to synchronize the adaptation layer processing means 40 and the voice processing means 50 (preferably, according to a forty frame superframe of five milliseconds) as well as to send control information. The control information includes two bits to provide a forty frame synchronization signal, a bit which indicates whether the data is compressed or not, a bit to indicate silence, a bit to indicate tone detection, and a bit to indicate an "out of data" indication. The presently preferred arrangement of bits is shown in Table 2.

TABLE 2

| BIT | FUNCTION |
| --- | --- |
| 0 | synch and valid flag |
| 1 | synch and valid flag |
| 2 | compressed or not |
| 3 | silence |
| 4 | tone detected |
| 5 | valid data or resynch |
| 6 | out of data |
| 7 | future use |

In particular, in the preferred embodiment of the invention, bit values of "10" for bits 0 and 1 are used as synchronization bits to indicate the start of a forty frame superframe, i.e., a superframe of five milliseconds of data. The remainder of the bits are considered valid only when the synchronization bits are at the preset value of "10". In the LIM-to-switch direction, bits 0 and 1 should be set to "10" every five milliseconds. In the switch-to-LIM direction, in a preferred embodiment of the invention, a "10" indication is only provided if data was received by the adaptation processor; i.e., during a period of no silence.

Bit 2 is effectively generated by the encoder 272 (FIG. 4a) and is used to indicate whether the data is compressed or not; it being assumed that only one type of compression is being conducted by the voice processing means (e.g., 4-bit ADPCM) for a given channel. Thus, when bit 2 is set (i.e., value=1), compression is indicated; and when bit 2 is not set (i.e., value=0), no compression has been conducted on the associated data being sent over the high speed data highway.

Bit 3 is effectively set by the silence detector 266, and when set indicates a five millisecond period of silence such that the data being received over the high speed data highway can be ignored. In the LIM-to-switch direction, the silence bit is set every five milliseconds in a period of silence exceeding five milliseconds. In the switch-to-LIM direction, in the preferred embodiment of the invention, the silence bit 3 is only set once per period of silence by the adaptation processor, because only during a transition from no silence to silence will the synch/valid flag be set to "10".

Bit 4 is controlled by the fax/modem tone detector 264. When set, bit 4 indicates that a tone has been detected so that the adaptation processor 40 can notify the management processor 50, which in turn can turn off echo cancellation and ADPCM or CELP encoding in the LIM-to-switch direction, and the ADPCM or CELP decoding in the switch-to-LIM direction.

Bit 5 may be used, if desired, in conjunction with the G.729a standard which utilizes ten millisecond block sizes, with five milliseconds of valid data alternating with five milliseconds of non-valid data. Alternatively, bit 5 may be used for resynchronization should the DSP array and adaptation processor lose synchronization.

Bit 6 is used in the LIM-to-switch direction to indicate an out-of-data condition. The out-of-data condition can arise, e.g., where the adaptation processor 40 has no data due to a lost cell, and it therefore does not send a synch/valid flag. In that situation, because the DSP array is expecting data (no silence flag having previously being sent) the DSP array 30 will have no data to process, will insert silence, and send the out-of-data flag. Receipt by the adaptation processor of an out-of-data flag permits the adaptation processor to reset its buffer pointers and send a message to the management processor. Bit 6 is not used in the switch-to-LIM direction.

Presently, bit 7 is not defined and can be used for additional functionality. For example, bit 7 can be used to redefine all or some of bits 0–6.

Figure 5:
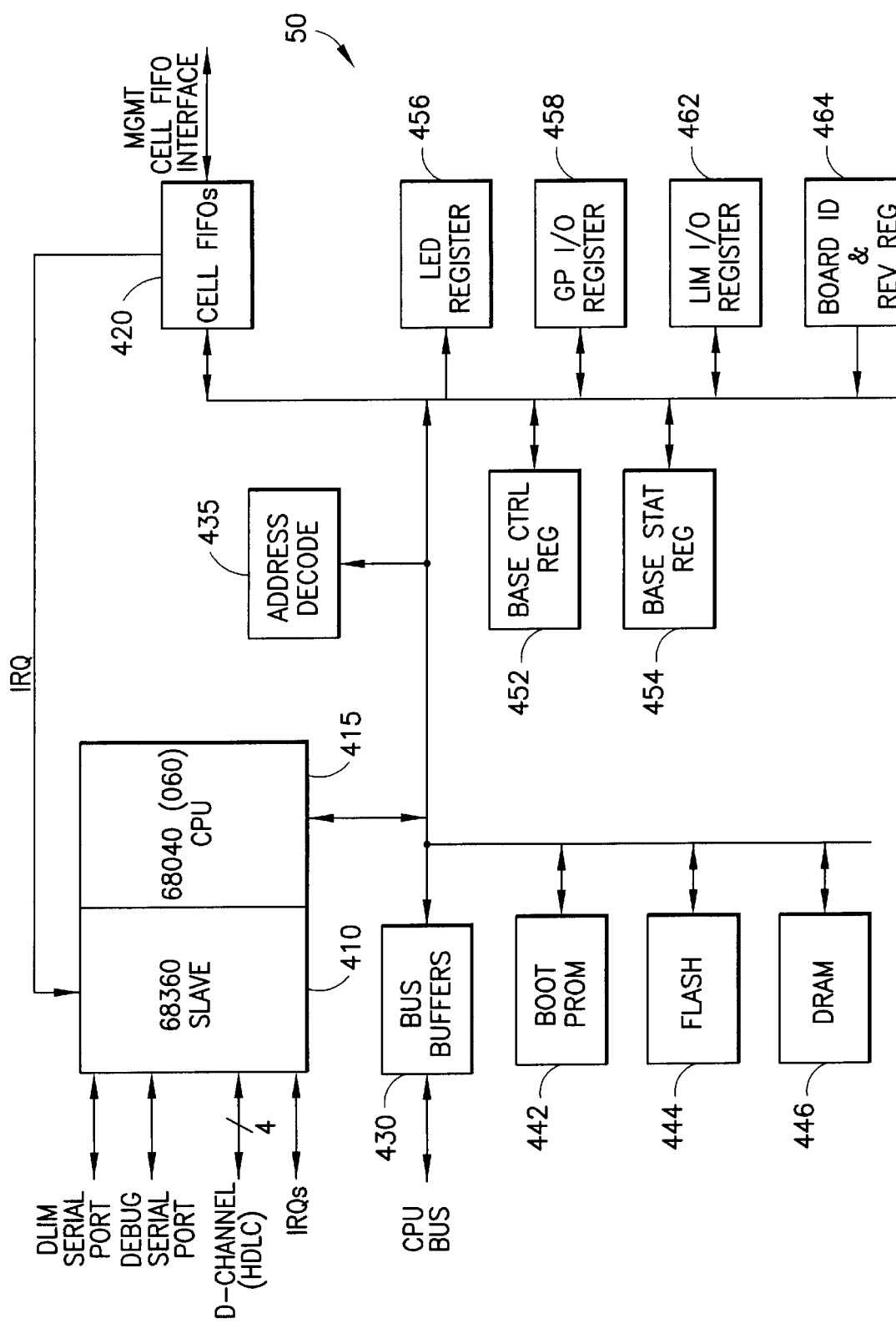
FIG. 5 is a block diagram of the functional blocks of the management processor of FIG. 2.

Turning now to FIG. 5, a block diagram of the functional blocks of the management processor 40 is seen. The management processor 40 is seen to include a Motorola 68360 slave processor 410, a 68040 master CPU 415, cell FIFOs 420, CPU (microprocessor) bus buffers 430, an address decoder 435, a boot PROM 442, a flash RAM 444, a DRAM 446, a base control register 452, a base status register 454, a LED register 456, a general purpose I/O register 458, a LIM I/O register 462, and a board ID and revision register 464. The management processor 40 generally provides hardware initialization and real time control, configuration, diagnostics, status, alarms, and call control for the voice server module 18VSM. The address decode 435, boot PROM 442, flash memory 444 and DRAM 446 all function as is standard in the art. The base control register 452 permits the management processor 40 to reset elements of the module 18VSM independently of each other, while the board ID and revision register 464 keeps information regarding the hardware revision of the module and the ID number of the module. The base status register 454 keeps status information regarding the various elements of the module 18VSM. The LED register 456 controls the lighting of the front panel LEDs (not shown). The general purpose I/O register is provided for general communication with elements of the management processor 40. Information intended for the LIM is provided to the LIM I/O register 462. The management processor 40 communicates to the internal elements of the voice server module (shown with the "mgmt" inputs) such as the DSP array 30, the CAS processor 60, etc., and to the LIM using the CPU bus which is buffered by buffers 430. The management processor 40 communicates to other boards of the switch 10 by generating ATM cells and passing them to the switch via the cell FIFOs 420. Preferably, the management processor 40 uses a packet-type protocol in those communications. In fact, the management processor 40 (and hence the voice server module as a whole) is preferably provided with an IP address so that it may be contacted by other suitable means off of the switch.

As previously mentioned, the slave processor 40 is used to process D-channel information which was extracted from an ISDN signal by the D-channel extractor/inserter 120 of the interface 20. As a result of processing the D-channel information, the management processor 50 performs necessary functions and sends necessary messages. The messages can be internal to the voice server module 18VSM or can be messages that are formatted into AAL5 format for transfer across the switch fabric, to another module and LIM and out to the network. Alternatively, or in addition, the management processor 50 can generate signals which are provided to the adaptation processor 40 which formats them into AAL5 type signals. The management processor can also generate D-channel signals (in response to external information) for insertion at the D-channel extractor/inserter 120 into an outgoing ISDN signal.

Figure 6:
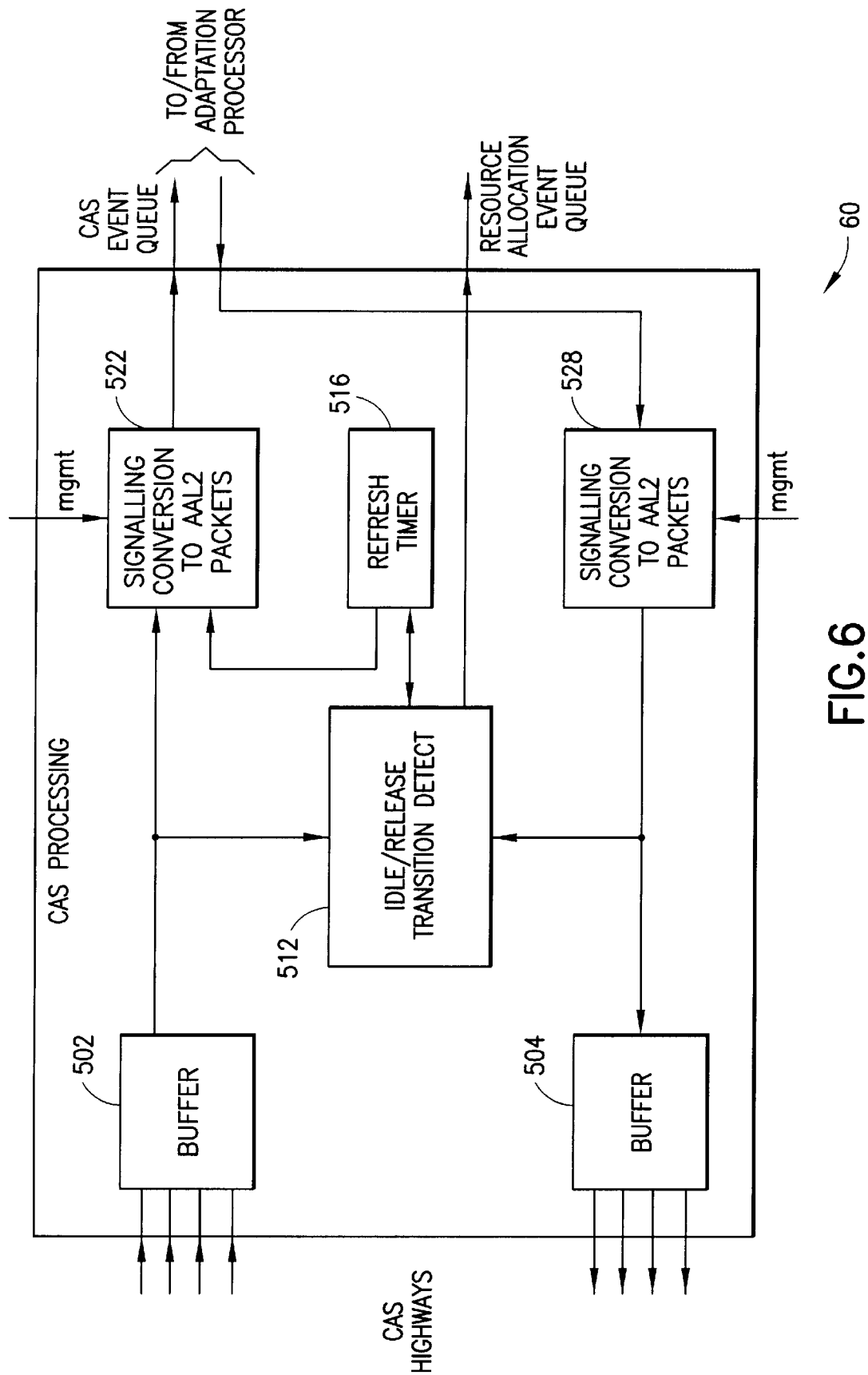
FIG. 6 is a block diagram of the functional blocks of the CAS processor of FIG. 2.

Turning to FIG. 6, a block diagram is seen of the functional blocks of the CAS processor 60. The CAS processor, which may be contained on the chip or chipsets implementing other functions (e.g., the adaptation processor 40) includes buffers 502, 504 for the incoming and outgoing LIM signalling highways, an idle/release and transition detect logic block 512, a refresh timer 516, a signalling conversion to AAL2 packets block 522, and a signalling conversion from AAL2 packets block 528. Channel associated signaling from the LIM with respect to any of the four T1 or E1 lines are received at the buffers 502. The idle/release transition detect block 512 monitors the incoming signaling in order to determine a change in state (e.g., off-hook to on-hook), and based on the current state of the line and the change in state, whether the management processor needs to know of the situation. Where the management processor 50 needs to allocate resources as a result of the incoming signals (e.g., to set up an AAL2 channel), the CAS processing block sends a message to the resource allocation event queue of the management processor 50. Once the resources have been allocated by the management processor 50, the management processor enables the signal converter 522 to packetize the incoming data (stored in buffers 502) into AAL2 type data for forwarding to the adaptation processor 40. In the preferred embodiment of the invention, the refresh timer 516 also sends data to the adaptation processor 40. In particular, every five seconds, the refresh timer 516 ascertains the present state of the channels (as stored by the idle/release transition detect logic block 512) and forwards that state to the signal converter 522 for packetizing and forwarding to the adaptation processor.

In the switch-to-LIM direction, AAL2 packets containing CAS information are provided to the CAS processor 60 by the adaptation processor 40. The CAS information is converted by the signalling conversion block 528 into E1 or T1 type data and forwarded to the buffers 504. At the same time, the CAS information is read by the idle/release transition detect block 512 for change of state information which might require action by the management processor 50.

There have been described and illustrated herein a voice server module for an ATM switch. While particular embodiments of the invention have been described, it is not intended that the invention be limited thereto, as it is intended that the invention be as broad in scope as the art will allow and that the specification be read likewise. Thus, while the invention has been described with reference to a particular ATM switch, it will be appreciated that the invention applies to different types of ATM switches. Also, while the invention has been described with reference to particular functional blocks, it will be appreciated that in many cases the functional blocks can be combined or divided while still maintaining the functionality of the invention, and also that various functional blocks are often preferably accomplished in software. In addition, while particular bus arrangements and speeds have been described, it will be appreciated that other bus arrangements could be utilized. For example, rather than having separate high speed data and flag buses linking the voice processing means and the adaptation processor, an even higher speed bus with interleaved voice and flag information could be utilized, provided appropriate circuitry and functionality is provided for multiplexing and demultiplexing the two streams. Further, while various novel aspects of the invention were described, it will be appreciated that each of the novel aspects stands independently of the others. For example, while a novel DSP array for processing voice data is provided, it will be appreciated that the voice processor/adaptation processor interface which utilizes separate flag and data buses could be utilized with a single voice data DSP. Similarly, the provision of the alternative data paths for the AAL2 and AAL1 data in the voice server module stands independently of the separate flag and data bus arrangement and from the DSP array. It will therefore be appreciated by those skilled in the art that yet other modifications could be made to the provided invention without deviating from its spirit and scope as so claimed.

We claim:

1. A module for an ATM switch, comprising:
   a) interface means for receiving telecommunications data, said telecommunications data including voice data and non-voice data;
   b) voice data processing means coupled to said interface means, said voice data processing means for receiving said voice data, and for processing said voice data and not said non-voice data so as to conduct at least one of echo cancellation on and data encoding of said voice data; and
   c) adaptation processing means coupled to said voice data processing means and coupled by a bus to said interface means, said adaptation processing means for receiving said non-voice data via said bus, for processing said non-voice data so that said non-voice data conforms to an AAL1-type format, for receiving said voice data from said voice data processing means, and for processing said voice data so that said voice data conforms to an AAL2-type format.

2. A module for an ATM switch having a switch fabric according to claim 1, wherein:

said adaptation processing means comprises an adaptation processing means for forwarding said processed non-voice AAL1 type formatted data and said processed voice AAL2-type to the switch fabric.

3. A module according to claim 1, wherein:

said interface means for receiving telecommunications data receives said telecommunications data including voice data and non-voice data from a plurality of data buses and multiplexes said voice data and non-voice data into a stream of multiplexed data including said voice data and said non-voice data.

4. A module according to claim 3, wherein:

said voice data processing means receives said multiplexed data and includes means for distinguishing said voice data from said non-voice data.

5. A module according to claim 4, wherein:

said bus carries said multiplexed data and said adaptation processor means includes means for distinguishing said voice data from said non-voice data in said multiplexed data.

6. A module according to claim 1, wherein:

said voice processing means includes at least one of (i) means for detecting a fax or modem tone, and (ii) means for detecting silence in speech.

7. A module according to claim 1, wherein:

said data encoding comprises at least one of ADPCM-type and CELP-type encoding.

8. A module according to claim 1, wherein:

said voice data received by said voice processing means comprises one of A-law and µ-law data.

9. A module according to claim 1, further comprising:

management processor means coupled to said voice processing means for configuring said voice processing means.

10. A module according to claim 9, wherein:

said interface means includes means for demultiplexing D-channel information from said telecommunications data, said management processor is coupled to said interface means, and said management processor includes means for processing said D-channel information.

11. A module according to claim 10, wherein:

said management processor means comprises means for processing said non-voice data so that said non-voice data conforms to an AAL5-type format.

12. A module according to claim 4, further comprising:

management processor means coupled to said voice processing means for configuring said means for distinguishing said voice data from said non-voice data.

13. A module for an ATM switch, comprising:

a) interface means for receiving ISDN-type telecommunications data, said telecommunications data including voice data and non-voice data, and said interface means includes means for demultiplexing D-channel information from said ISDN-type telecommunications data;

b) voice data processing means coupled to said interface means, said voice data processing means for receiving said voice data, and for processing said voice data so as to conduct at least one of echo cancellation on and data encoding of said voice data;

c) adaptation processing means coupled to said voice data processing means, said adaptation processing means for receiving said voice data from said voice data processing means, and for processing said voice data so that said voice data conforms to an AAL2-type format; and d) management processor means coupled to said interface means, said management processor includes means for processing said D-channel information so that said D-channel information conforms to an AAL5-type format.

14. A module for an ATM switch according to claim 13, wherein:

said management processor means has an IP address.

* * * * *